US007593647B2

(12) United States Patent  
Lee et al.

(10) Patent No.: US 7,593,647 B2
(45) Date of Patent: Sep. 22, 2009

(54) APPARATUSES AND METHODS FOR AUTOMATIC WAVELENGTH LOCKING OF AN OPTICAL TRANSMITTER TO THE WAVELENGTH OF AN INJECTED INCOHERENT LIGHT SIGNAL

(75) Inventors: Chang-Hee Lee, Taejon (KR); Kwang-Uk Chu, Taejon (KR); Bong-Soo Kim, Taejon (KR)

(73) Assignee: Novera Optics, Inc., Santa Clara, CA (US)

( * ) Notice: Subject to any disclaimer, the term of this patent is extended or adjusted under 35 U.S.C. 154(b) by 355 days.

(21) Appl. No.: 10/528,445

(22) PCT Filed: Apr. 22, 2003

(86) PCT No.: PCT/US03/12649

§ 371 (c)(1),
(2), (4) Date: Mar. 18, 2005

(87) PCT Pub. No.: WO2004/028047

PCT Pub. Date: Apr. 1, 2004

(65) Prior Publication Data

US 2006/0045542 A1    Mar. 2, 2006

(30) Foreign Application Priority Data

Sep. 19, 2002  (KR) .............................. 2002-57223

(51) Int. Cl.
*H04B 10/04* (2006.01)
(52) U.S. Cl. ........................ 398/195; 398/182; 398/183; 398/184; 398/186; 398/192; 398/193; 398/194; 398/196; 398/197; 398/198; 398/200; 398/201; 398/202; 398/208; 398/209; 398/66; 398/67; 398/68; 398/70; 398/71; 398/72; 398/91; 398/92; 398/93; 398/94

(58) Field of Classification Search .................. 398/182, 398/183, 184, 186, 192, 95, 193, 94, 194, 398/92, 195, 93, 196, 91, 197, 79, 198, 200, 398/159, 201, 158, 81, 199, 66, 67, 68, 70, 398/71, 72, 33, 202, 208, 209

See application file for complete search history.

(56) References Cited

U.S. PATENT DOCUMENTS 4,563,087 A    1/1986  Bourbin et al.
(Continued)

FOREIGN PATENT DOCUMENTS

EP    0060033 A  *  9/1982
(Continued)

OTHER PUBLICATIONS

Feldman, Robert D., et al.,"An Evaluation of Architectures Incorporating Wavelength Division Multiplexing for Broad-Band Fiber Access," Journal of Lightwave Technologies, vol. 16, No. 9, pp. 1546-1559. Sep. 1998.

(Continued)

*Primary Examiner*—Hanh Phan
(74) *Attorney, Agent, or Firm*—Blakely Sokoloff Taylor & Zafman LLP

(57) ABSTRACT

An optical transmitter has a resonance wavelength characteristic that varies with the refractive index of the optical transmitter. The optical transmitter receives a narrow band injected wavelength signal from an incoherent light source. The controller substantially matches a resonant wavelength of the optical transmitter to the wavelength of the injected wavelength signal by changing the refractive index of the optical transmitter to substantially match the resonant wavelength of the optical transmitter and the wavelength of the injected wavelength signal. A detector measures a parameter of the optical transmitter to provide a feedback signal to a controller to determine when the resonant wavelength of the optical transmitter and the wavelength of the injected wavelength signal are substantially matched.

21 Claims, 8 Drawing Sheets

U.S. PATENT DOCUMENTS

| | | | |
|---|---|---|---|
| 4,912,526 A | 3/1990 | Iwaoka et al. | |
| 4,947,134 A | 8/1990 | Olsson | |
| 5,117,303 A | 5/1992 | Desurvire et al. | |
| 5,202,780 A | 4/1993 | Fussanger | |
| 5,221,983 A | 6/1993 | Wagner | |
| 5,251,001 A | 10/1993 | Dave et al. | |
| 5,276,543 A | 1/1994 | Olshansky | |
| 5,307,366 A | 4/1994 | Auffret et al. | |
| 5,321,541 A | 6/1994 | Cohen | |
| 5,379,309 A * | 1/1995 | Logan, Jr. ............... | 372/18 |
| 5,408,349 A | 4/1995 | Tsushima et al. | |
| 5,412,673 A | 5/1995 | Caprara et al. | |
| 5,434,662 A | 7/1995 | Rockwell et al. | |
| 5,436,760 A | 7/1995 | Nakabayashi | |
| 5,440,417 A | 8/1995 | Chung et al. | |
| 5,550,666 A | 8/1996 | Zirngibl | |
| 5,589,970 A | 12/1996 | Lyu et al. | |
| 5,661,585 A | 8/1997 | Feldman et al. | |
| 5,694,234 A | 12/1997 | Darcie et al. | |
| 5,793,512 A * | 8/1998 | Ryu ............... | 398/97 |
| 5,880,865 A | 3/1999 | Lu et al. | |
| 5,894,247 A | 4/1999 | Yoshida et al. | |
| 5,907,417 A | 5/1999 | Darcie et al. | |
| 5,920,414 A | 7/1999 | Miyachi et al. | |
| RE36,471 E | 12/1999 | Cohen | |
| 6,034,799 A | 3/2000 | Hansen | |
| 6,097,523 A | 8/2000 | Boot | |
| 6,137,611 A | 10/2000 | Boivin et al. | |
| 6,178,001 B1 | 1/2001 | Kim | |
| 6,304,350 B1 | 10/2001 | Doerr et al. | |
| 6,307,668 B1 | 10/2001 | Bastien et al. | |
| 6,323,994 B1 | 11/2001 | Li et al. | |
| 6,437,907 B1 | 8/2002 | Yoon et al. | |
| 6,600,760 B1 * | 7/2003 | Green et al. ............ | 372/20 |
| 6,650,840 B2 | 11/2003 | Feldman | |
| 6,654,401 B2 | 11/2003 | Vieira et al. | |
| 6,674,969 B1 | 1/2004 | Ogusu | |
| 6,868,200 B2 | 3/2005 | Kimotsuki et al. | |
| 6,888,856 B2 | 5/2005 | Green et al. | |
| 7,106,974 B2 | 9/2006 | Lee et al. | |
| 7,327,957 B2 | 2/2008 | Lee et al. | |
| 7,349,631 B2 | 3/2008 | Lee et al. | |
| 2001/0004290 A1 * | 6/2001 | Lee et al. ............ | 359/124 |
| 2001/0013962 A1 | 8/2001 | Li | |
| 2001/0046364 A1 | 11/2001 | Ajima et al. | |
| 2002/0068859 A1 | 6/2002 | Knopp | |
| 2002/0196491 A1 | 12/2002 | Deng et al. | |
| 2003/0076560 A1 | 4/2003 | Pratt et al. | |
| 2003/0095736 A1 | 5/2003 | Kish et al. | |
| 2003/0142978 A1 | 7/2003 | Lee et al. | |
| 2003/0206740 A1 | 11/2003 | Lee et al. | |
| 2004/0067059 A1 | 4/2004 | Song et al. | |
| 2004/0184805 A1 | 9/2004 | Shin et al. | |
| 2004/0208208 A1 | 10/2004 | Shin et al. | |
| 2005/0163503 A1 | 7/2005 | Lee et al. | |
| 2005/0286895 A1 | 12/2005 | Lee et al. | |
| 2006/0002706 A1 | 1/2006 | Lee et al. | |
| 2006/0263090 A1 | 11/2006 | Lee et al. | |
| 2007/0014509 A1 | 1/2007 | Kish, Jr. et al. | |
| 2007/0081823 A1 | 4/2007 | Lee et al. | |

FOREIGN PATENT DOCUMENTS

| | | | |
|---|---|---|---|
| EP | 0607 029 | A2 | 7/1994 |
| EP | 0844706 | A2 | 5/1998 |
| EP | 0844706 | A3 | 5/1998 |
| EP | 0991 217 | A2 | 4/2000 |
| EP | 1024 541 | A | 8/2000 |
| EP | 1089 098 | A1 | 4/2001 |
| JP | 08-163097 | | 6/1996 |
| KR | 10200000339646 | A | 6/2000 |
| KR | 1020000039036 | A | 8/2000 |
| KR | 1020010063062 | | 7/2001 |
| KR | 1020010063062 | A | 7/2001 |
| KR | 1020030063085 | A | 7/2003 |
| KR | 1020030065632 | A | 8/2003 |
| KR | 1020030086223 | A | 11/2003 |
| WO | WO 97/49248 | A1 | 12/1997 |
| WO | WO 00/10271 | | 2/2000 |
| WO | WO 03/032547 | A2 | 4/2003 |
| WO | WO 03/063401 | A2 | 7/2003 |
| WO | WO 03/065621 | A1 | 8/2003 |
| WO | WO 03/107057 | A1 | 12/2003 |
| WO | WO 2004/034621 | A2 | 4/2004 |

OTHER PUBLICATIONS

Healey, P., et al. "Spectral Slicing WDM-PON Using Wavelength-Seeded Reflective SOAs", pp. 1181-1182 (Abstract only submitted herewith), Electronics Letters, published Sep. 13, 2001, vol. 37, Issue 19. ISSN: 0013-5194.

Jung, D.K., et al., "Wavelength-Division-Multiplexed Passive Optical Network Based on Spectrum-Slicing Techniques", Copyright 1998 IEEE, 1041-1135/98, IEEE Photonics Technology Letters, vol. 10, No. 9, Sep. 1998. pp. 1334-1336.

Lee, J.S., et al., "Spectrum-Sliced Fiber Amplifier Light Source for Multichannel WDM Applications", Copyright 1993 IEEE, pp. 1458-1461, IEEE Photonics Technology Letters, vol. 5, No. 12, Dec. 1993.

Noise Characteristics of Solitary Laser Diodes, Section 7.3.2 Mode partition noise, pp. 163-166., 1988.

Oh, Tae-Won, et al., "Broadband Light Source for Wavelength-Division Multiple Access Passive Optical Network," Dept. of Electrical Engineering, Korea Advanced Institute of Sci and Tech, and Novera Optics Korea, Inc., Nov. 29, 2007.

PCT Invitation to Pay Additional Fees for PCT Counterpart Application No. PCT/US03/12054 Containing Communication Relating to the Results of the Partial International Search, 6 pages. Feb. 11, 2004.

PCT Notification Concerning Transmittal of International Preliminary Report on Patentability (Chapter 1 of the Patent Cooperation Treaty) for PCT Counterpart Application No. PCT/IB2004/002187 Containing International Search Report, 4 pages. Oct. 25, 2007.

PCT Notification of Transmittal of International Search Report for PCT Counterpart Application No. PCT/US03/12054 Containing International Search Report, 9 pages. Mar. 31, 2004.

PCT Notification of Transmittal of the International Search Report and Written Opinion of the International Searching Authority or the Declaration for PCT Counterpart Application No. PCT/IB2004/002187 Containing International Search Report, 7 pages. Sep. 17, 2007.

PCT Written Opinion for PCT Counterpart Application No. PCT/US03/12054, 6 pages. May 2, 2005.

Sampson, D.D., et al., "100 mW Spectrally-Uniform Broadband ASE Source for Spectrum-Sliced WDM Systems", Electronics Letters, IEE Stevenage, GB, vol. 30, No. 19, Sep. 15, 1994, pp. 1611-1612. XP006001052 ISSN: 0013-5194.

Kim, Hyun Deok et al., "A Low-Cost WDM Source with an ASE Injected Fabry-Perot Semiconductor Laser," XP000968561, IEEE Photonics Technology Letters, vol. 12, No. 8, Aug. 2000, pp. 1067-1069.

PCT Notification of Transmittal of International Search Report for PCT Counterpart Application No. PCT/US03/12649 Containing International Search Report, 11 pgs. (Feb. 6, 2004).

PCT Written Opinion for PCT Counterpart Application No. PCT/US03/12649, 5 pgs. (Nov. 5, 2004).

Mayweather, Derek, et al., "Wavelength Tracking of a Remote WDM Router in a Passive Optical Network," XP 000624886, IEEE, Photonics Technology Letters, vol. 8, No. 9, Sep. 1996, 3 pages.

Pezeshki, B., et al., "12 Element Multi-wavelength DFB arrays for Widely Tunable Laser Modules," ThGG71 5:30 pm, Thursday Afternoon/OFC 2002/, pp. 711-712.

Heanue, J., et al., "Widely Tunable Laser Module Using DFB Array and MEMs Selection with Internal Wavelength Locker," MF67 5:30 pm, vol. 1/OFC 2003/Monday Afternoon, pp. 82-83.

* cited by examiner

APPARATUSES AND METHODS FOR AUTOMATIC WAVELENGTH LOCKING OF AN OPTICAL TRANSMITTER TO THE WAVELENGTH OF AN INJECTED INCOHERENT LIGHT SIGNAL

RELATED APPLICATIONS

This application is a National Phase Application of International Application No. PCT/US2003/012649, filed Apr. 22, 2003, which claims the priority of the South Korean Patent Application entitled "Temperature control method for automatic wavelength locking of a Fabry-Perot laser diode to the wavelength of the injected incoherent light," Ser. No. 2002-57223, filed Sep. 19, 2002. The present application claims priority from both applications.

FIELD

Embodiments of this invention relate to wavelength locking of an optical transmitter to the wavelength of an injected incoherent light signal. More particularly, an aspect of an embodiment of this invention relates to wavelength locking of an optical transmitter to the wavelength of an injected incoherent light signal in a wavelength-division-multiplexing optical network.

BACKGROUND

Various light sources may be used for wavelength-division-multiplexing in optical transmission equipment to generate light of a desired wavelength. Some light sources may not stably generate light of a desired wavelength, and may not have a narrow line width for reduced color dispersion. In addition, these light sources may not have a large side mode suppression ratio for reduced crosstalk with adjacent channels. Thus, the light sources may not be optimal for use in a wavelength-division-multiplexing optical network. Some light sources, such as a narrow band distributed feedback laser, may not be economical for mass distribution in an optical communication system.

SUMMARY

Various methods, systems, and apparatuses are described in which an optical network includes an optical transmitter, a controller and a detector. The optical transmitter has a resonance wavelength characteristic that varies with the refractive index of the optical transmitter. The optical transmitter receives a narrow band injected wavelength signal from an incoherent light source. The controller substantially matches a resonant wavelength of the optical transmitter to the wavelength of the injected wavelength signal by changing the refractive index of the optical transmitter to substantially match the resonant wavelength of the optical transmitter and the wavelength of the injected wavelength signal. The detector measures a parameter of the optical transmitter to provide a feedback signal to the controller to determine when the resonant wavelength of the optical transmitter and the wavelength of the injected wavelength signal are substantially matched.

Other features and advantages of the present invention will be apparent from the accompanying drawings and from the detailed description that follows below.

BRIEF DESCRIPTION OF THE DRAWINGS

The present invention is illustrated by example and not limitation in the figures of the accompanying drawings, in which like references indicate similar elements and, in which.

DETAILED DESCRIPTION

In general, various optical networks are described. For an embodiment, an optical network includes an optical transmitter, a controller and a detector. The optical transmitter has a resonance wavelength characteristic that varies with the refractive index of the optical transmitter such as a Fabry-Perot laser diode. The optical transmitter receives a narrow band injected wavelength signal from an incoherent light source. The controller, such as a temperature controller, power controller, etc., substantially matches a resonant wavelength of the optical transmitter to the wavelength of the injected wavelength signal by changing the refractive index of the optical transmitter. The controller may change the refractive index of the optical transmitter by, for example, controlling the operating temperature of the optical transmitter or changing the bias current supplied to the optical transmitter. The detector measures a parameter of the optical transmitter, such as the bias current through the optical transmitter or the optical power from the optical transmitter, to provide a feedback signal to the controller to determine when the resonant wavelength of the optical transmitter and the wavelength of the injected wavelength signal are substantially matched. The refractive index (n) of an optical transmitter may be the ratio of the velocity of propagation of an electromagnetic wave in vacuum to its velocity in the active medium of the optical transmitter.

Figure 1:
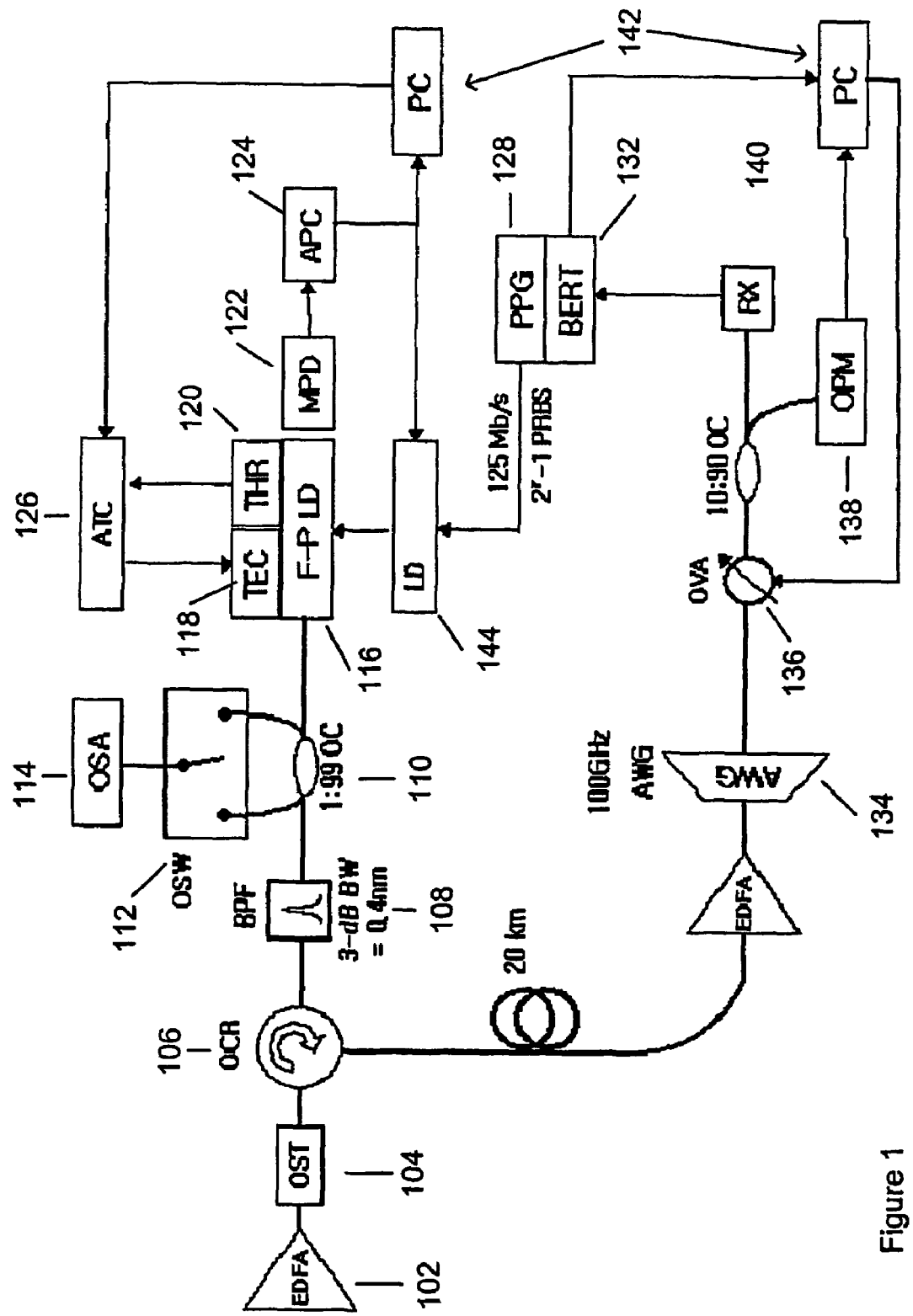
FIG. 1 illustrates a block diagram of an embodiment of an optical network wavelength locking the resonant wavelength of the optical transmitter to the wavelength of the injected wavelength signal by shifting a refractive index of the optical transmitter.

FIG. 1 illustrates a block diagram of an embodiment of an optical network wavelength locking a resonant wavelength of the optical transmitter to the wavelength of an injected wavelength signal by shifting a refractive index of the optical transmitter. The optical network 100 may include a broadband light source 102 such as a Erbium-doped fiber amplifier, an optical shutter 104, an optical circulator 106, a band pass filter 108, an optical coupler 110, an optical switch 112, an optical spectrum analyzer 114, an optical transmitter 116 that has a resonance wavelength characteristic that varies with the refractive index of the optical transmitter 116 such as a Fabry-Perot laser diode, etc., a thermoelectric cooler 118, a temperature sensor 120 such as a resistance temperature detector, a thermister, etc., an optical power detector 122 such as a monitor photo-diode, an automatic power controller 124, an automatic temperature controller 126, a modulator 128 such as a psuedo-random bit sequence by a pulse pattern generator 130, a bit error ratio detector 132, a multiplexer/demultiplexer such as an arrayed-waveguide grating 134, an optical variable attenuator 136, an optical power meter 138, a receiver 140, and a computer 142.

An optical transmitter 116, such as a Fabry-Perot laser diode, may need adjustments to optimize wavelength locking to the wavelength of an injected incoherent light signal from the broadband light source 102. The wavelength of the oscillation modes of the optical transmitter 116 shift as its refractive index changes. The bandwidth of a cavity mode of the optical transmitter 116 may be shifted to include the wavelength of the injected incoherent signal.

The example optical network 100 may check the degree of wavelength locking and the results of wavelength locking the optical transmitter 116. The refractive index of the optical transmitter 116 may be controlled by controlling the temperature of the optical transmitter 116 and/or a bias current supplied to the optical transmitter 116. The feedback signal to control the refractive index of the optical transmitter 116 may be based on the actual temperature the measurement value of a temperature sensor 120 located near the optical transmitter 116, the average current of the optical transmitter 116, the average received optical power of the monitor photo-diode 122, a combination of these parameters, or some other similar monitored parameter. The temperature controller 118 cooperates with the feedback loop to try to maintain a wavelength matched temperature setting for the optical transmitter 116 by measuring the average current of the optical transmitter 116 or the average received optical power of the monitor photo-diode 122. The measured average current of the optical transmitter 116 and the measured average received optical power of the monitor photo-diode 122 differ according to the refractive index of the optical transmitter 116 and whether the resonant wavelength of the optical transmitter 116 and the wavelength of the injected wavelength signal are wavelength locked.

The incoherent light source 102 injects a narrow band wavelength the optical transmitter 116. The incoherent light source 102 supplies the narrow band optical signal to the optical transmitter 116 through the optical shutter 104, the optical circulator 106, the band pass filter 108, and the optical coupler 110. The automatic power controller 124 controls the average current flowing into the optical transmitter 116. The automatic temperature controller 118 maintains the temperature of the optical transmitter 116 to a set temperature by controlling the direction and strength of current flowing to the thermo-electric cooler 118. The automatic temperature controller 118 directs the temperature emitted from the thermoelectric cooler 118 so that the measurement value of a temperature sensor 120 located near to the optical transmitter 116 is maintained at a level indicated by the feedback signal that the wavelengths are matched. The temperature controller 118 adjusts the temperature of the optical transmitter 116 and uses the feedback signals from the monitored parameters to determine when the resonant wavelength of the optical transmitter 116 and the wavelength of the injected wavelength signal are wavelength locked.

For example, the temperature controller 118 controls the average operating temperature of the Fabry-Perot laser diode 116 so that an average optical power, received at the monitor photo-diode 122 coupled to the back facet of the Fabry-Perot laser diode 116 is maintained at approximately its maximum level. Similarly, the temperature controller 118 may control the average operating temperature of the Fabry-Perot laser diode so that an average bias current flowing into the Fabry-Perot laser diode 116 indicates a dip from its typical linear slope.

Current flowing to the optical transmitter 116 can be divided into bias current and modulation current. The bias current is typically a direct current and the modulation current is typically an alternating current. The automatic power controller 124 may determine the average of the total of the two currents. The automatic power controller 124 provides current control to the driver 144 so that the average received optical power of the monitor photo-diode 122 located at the back facet of the Fabry-Perot laser diode 116 is maintained at a substantially maximum level.

The automatic power controller 124 may also control the average current flowing into the Fabry-Perot laser diode 116 so that an average optical power received at the monitor photo-diode 122 coupled to the back facet of the Fabry-Perot laser diode 116 is maintained at approximately its maximum level.

Figure 2:
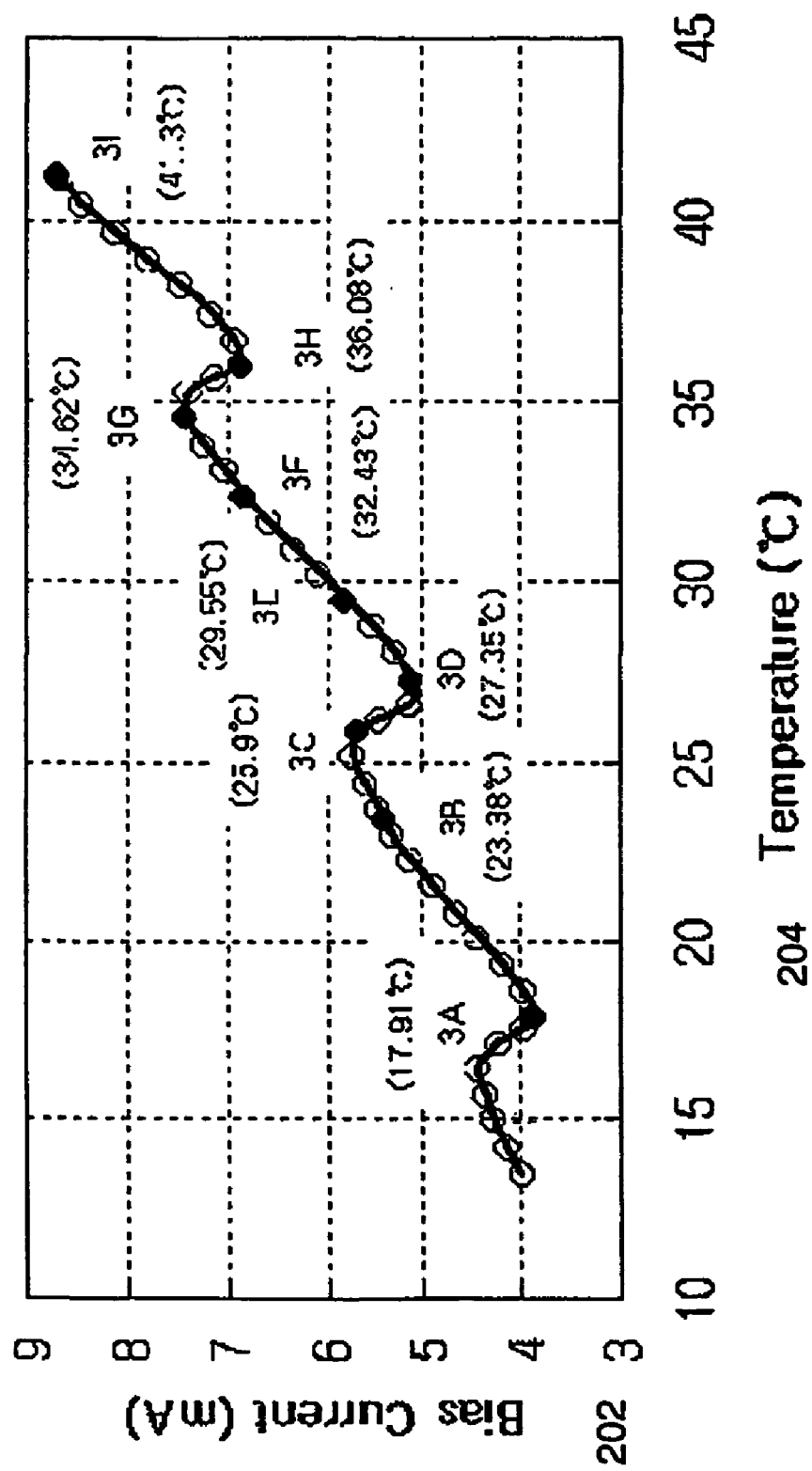
FIG. 2 illustrates a graph of an example curve of bias current verses operating temperature of the optical transmitter when the incoherent light signal is injected into the optical transmitter.

FIG. 2 illustrates a graph of an example curve of bias current verses operating temperature of the optical transmitter when the incoherent light signal is injected into the optical transmitter. In general, the measured bias current 202 of the optical transmitter gradually increases as temperature 204 increases. However, around the operating temperature where wavelength locking is well matched between the resonant wavelength of the optical transmitter and the wavelength of the injected wavelength signal bias current decreases locally in a dip from its typical linear slope. For example, around 27.35 degrees Celsius of the optical transmitter, the bias current 202 through the optical transmitter decreases from an increasing trend at around 5.8 ma to 5.0 ma. Similarly, around 17.91 and 36.08 degrees Celsius of the optical transmitter, the bias current 202 through the optical transmitter decreases as a local dip from the increasing trend.

Also, most of the injected incoherent light penetrates the optical transmitter to be received by the optical power detector when the temperatures are at a point where wavelength locking is substantially matched. A graph of the measured optical power may be the inverse of the measured bias current verses operating temperature of the optical transmitter curve, when the automatic power controller is not working. Most of the injected incoherent light penetrates the Fabry-Perot laser diode to be injected to the monitor photo-diode at the temperatures where wavelength locking is well matched. Thus, when wavelength locking is well matched, the measured optical power achieves a local crest or maximum measured optical power level.

In operation, the automatic power controller injects more bias current to the optical transmitter when the output optical power of the optical transmitter decreases. The automatic power controller adjusts the bias current of the optical transmitter to the strength of the light received by the optical power detector. The automatic power controller adjusts to decrease the bias current supplied to the optical transmitter as the optical power detector receives a stronger optical signal.

Optical transmitters may have more than one cavity mode in which to have a resonant wavelength with the injected incoherent signal. In the graph, the phenomenon that the bias current decreases locally is repeated. The bias current decreases locally because wavelength locking with the injected incoherent light may occur in any of the cavity modes. In this example, the oscillation modes of the Fabry-Perot laser diode occur at intervals of 0.8 nm wavelengths as temperature increases.

Therefore, if the temperature controller continuously changes the temperature of the optical transmitter based on the feedback signal to the temperature where bias current that flows into the Fabry-Perot laser diode decreases, then the wavelength of the Fabry-Perot laser diode is automatically locked to the wavelength of the injected incoherent light signal.

Figure 3:
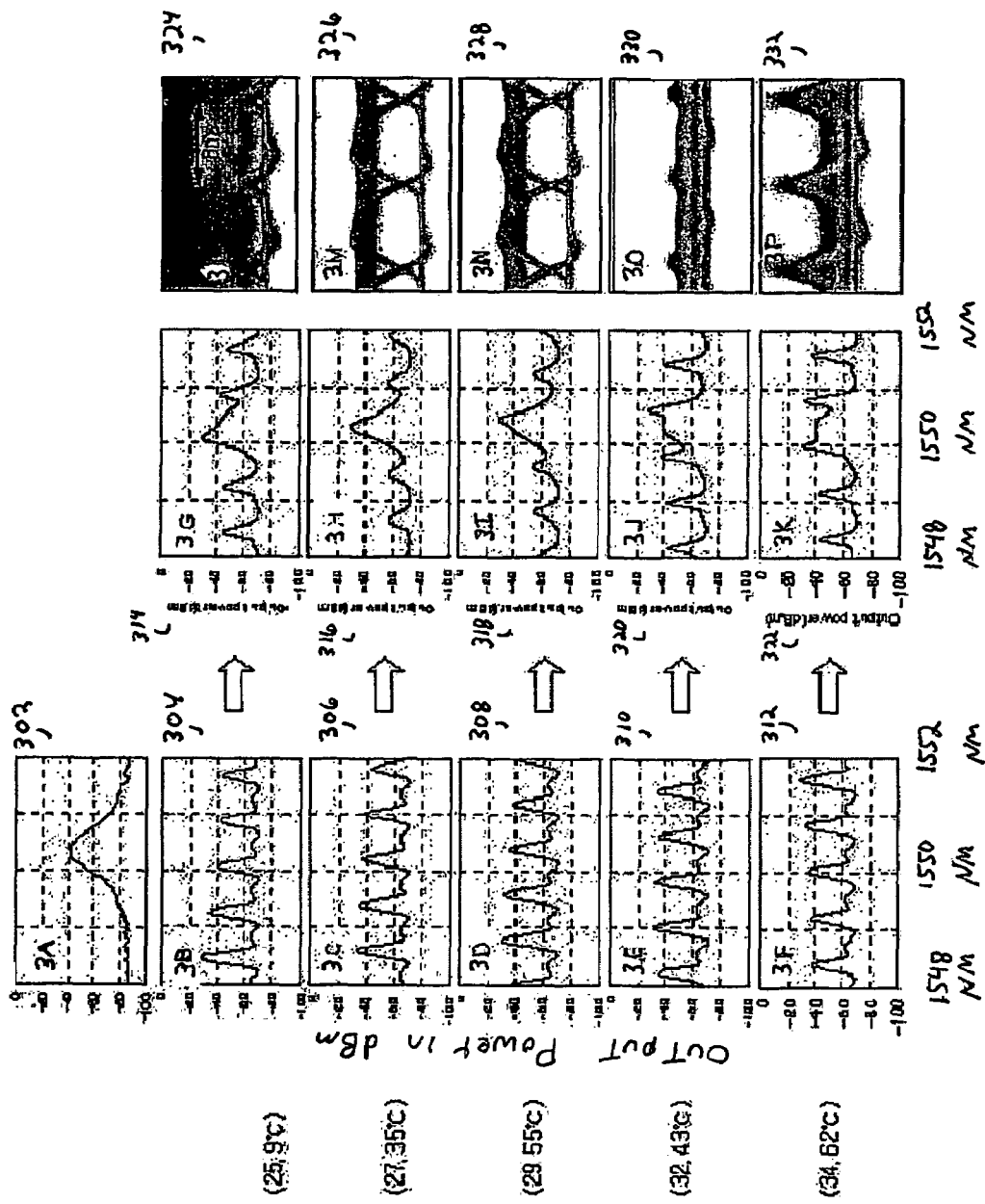
FIG. 3A through FIG. 3P illustrate eye diagrams and graphs of a spectrum of incoherent light injected to an optical transmitter at five different operating temperatures of the optical transmitter.

FIG. 3 illustrates example eye diagrams and graphs of an example spectrum of incoherent light injected to an optical transmitter at five different operating temperatures of the optical transmitter.

A first graph 302 illustrates the example spectrum of incoherent light to be injected. As shown in first graph 302, the example peak power of an arbitrary injected incoherent light was −21 dBm/0.06 nm at a peak wavelength of about 1550.3 nm.

The second graph 304 through the sixth graph 306 illustrate the wavelengths of the oscillation modes of the optical amplifier at the five different operating temperatures of the optical transmitter. As shown in second graph 304 through the sixth graph 306, the wavelength of the oscillation modes of the optical transmitter shift according to temperature of the optical transmitter. For example in the second graph 304, at 25.9 degrees Celsius the wavelength of the first oscillation mode is 1548.4 nm. In the fourth graph 308, at 29.55 degrees Celsius the wavelength of the first oscillation mode is 1548.8 nm.

The seventh graph 314 through the eleventh graph 322 illustrate the example output spectrum at the five different operating temperatures of the optical transmitter measured after injecting incoherent light. The twelfth graph 324 through the sixteenth graph 332 illustrate eye diagrams corresponding to the seventh graph 314 through the eleventh graph 322.

As shown in the eight graph 316 and the ninth graph 318, at operating temperatures of the optical transmitter of 27.35 degrees Celsius and 29.55 degrees Celsius, wavelength locking was well matched evidenced by a high-side mode suppression ratio of 25 dB and 23 dB respectively. Also, as shown in the thirteenth graph 326 and the fourteenth graph 328, at operating temperatures of the optical transmitter of 27.35 degrees Celsius and 29.55 degrees Celsius, wavelength locking was well matched evidenced by that the eye diagram were also clear.

As shown in the seventh graph 314, tenth graph 320, and eleventh graph 322, when the resonant wavelength of the optical transmitter and the wavelength of the injected wavelength signal were not substantially matched poor side mode suppression ratio were achieved. As shown in the twelfth graph 324, fifteenth graph 330, and the sixteenth graph 332, when the resonant wavelength of the optical transmitter and the wavelength of the injected wavelength signal were not substantially matched the eye diagram were also unclear.

Thus, the optical power coming from the optical transmitters may be monitored to determine when the resonant wavelength of the optical transmitter and the wavelength of the injected wavelength signal are substantially matched. Further, the operating temperature of the optical transmitter can be maintained at two or more different operating temperatures to wavelength lock the resonant wavelength of the optical transmitter and the wavelength of the injected wavelength signal.

Figure 4:
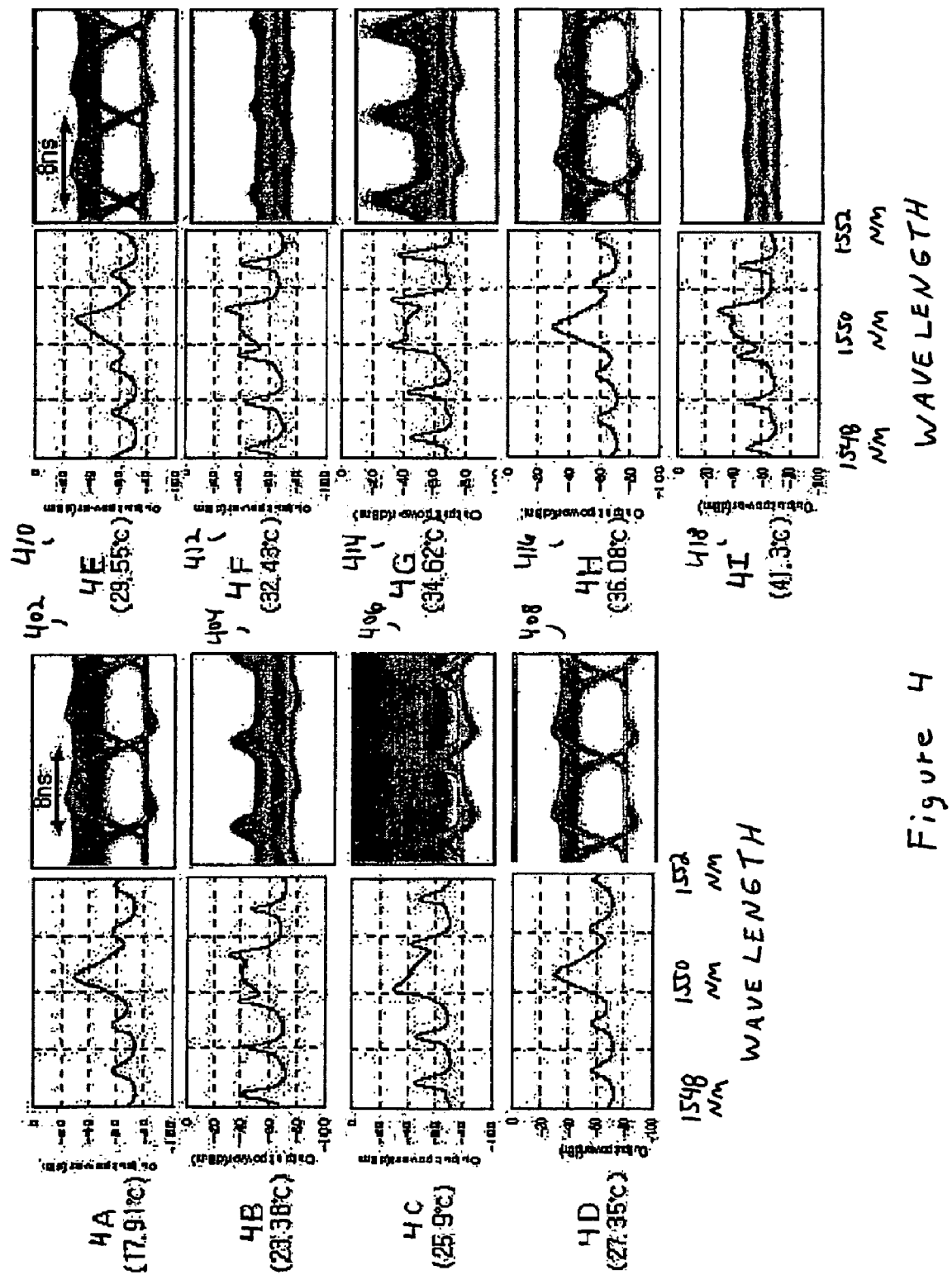
FIG. 4 illustrates the eye diagrams and graphs of the output spectrum at the nine different operating temperatures of the optical transmitter shown in FIG. 2.

FIG. 4 illustrates the example eye diagrams and graphs of the output spectrum at the nine different operating temperatures of the optical transmitter shown in FIG. 2. The different operating temperatures of the optical transmitter are 17.91, 23.38, 25.9, 27.35, 29.55, 32.43, 34.62, 36.08, 41.3 degrees Celsius.

The first graph 402 through the ninth graph 418 illustrates the example output spectrum and corresponding eye diagrams at the nine different operating temperatures of the optical transmitter measured after injecting incoherent light.

As shown in the first graph 402, the fourth graph 408, and the eight graph 416, at the operating temperatures of the optical transmitter of 17.91, 27.35 and 36.08 degrees Celsius, wavelength locking was well matched evidenced by a high side mode suppression ratio and clear eye diagrams. The operating temperatures of the optical transmitter at 17.91, 27.35 and 36.08 degrees Celsius correspond to the same three operating temperatures in FIG. 2 where the bias current decreased locally in a dip from its typical linear increasing slope.

Thus, the temperature controller may alter the operating temperatures of the optical transmitter until a current detector supplies an indication of this local dip in bias current or the optical power monitor supplies an indication of high side mode suppression ratio and clear eye diagrams.

The current detector may compare the bias current at current temperature with the bias current at the previous temperature to detect the local dip in bias current. Similarly, an optical power detector may compare the average optical power of the monitor photo-diode at current temperature with the average optical power of the monitor photo-diode at the previous temperature to determine if the optical power signal from the optical transmitter is at its crest. It will be evident to one skilled in the art that many other locking methods and techniques can be used to keep the laser temperature or pump current at the optimum point. For example, dithering the laser pump current and using a lock-in technique to keep the average pump current at the local minimum location. Other methods could include monitoring the dynamic fluctuations in the laser pump current and using feedback control to minimize these small dynamic fluctuations.

Figure 5:
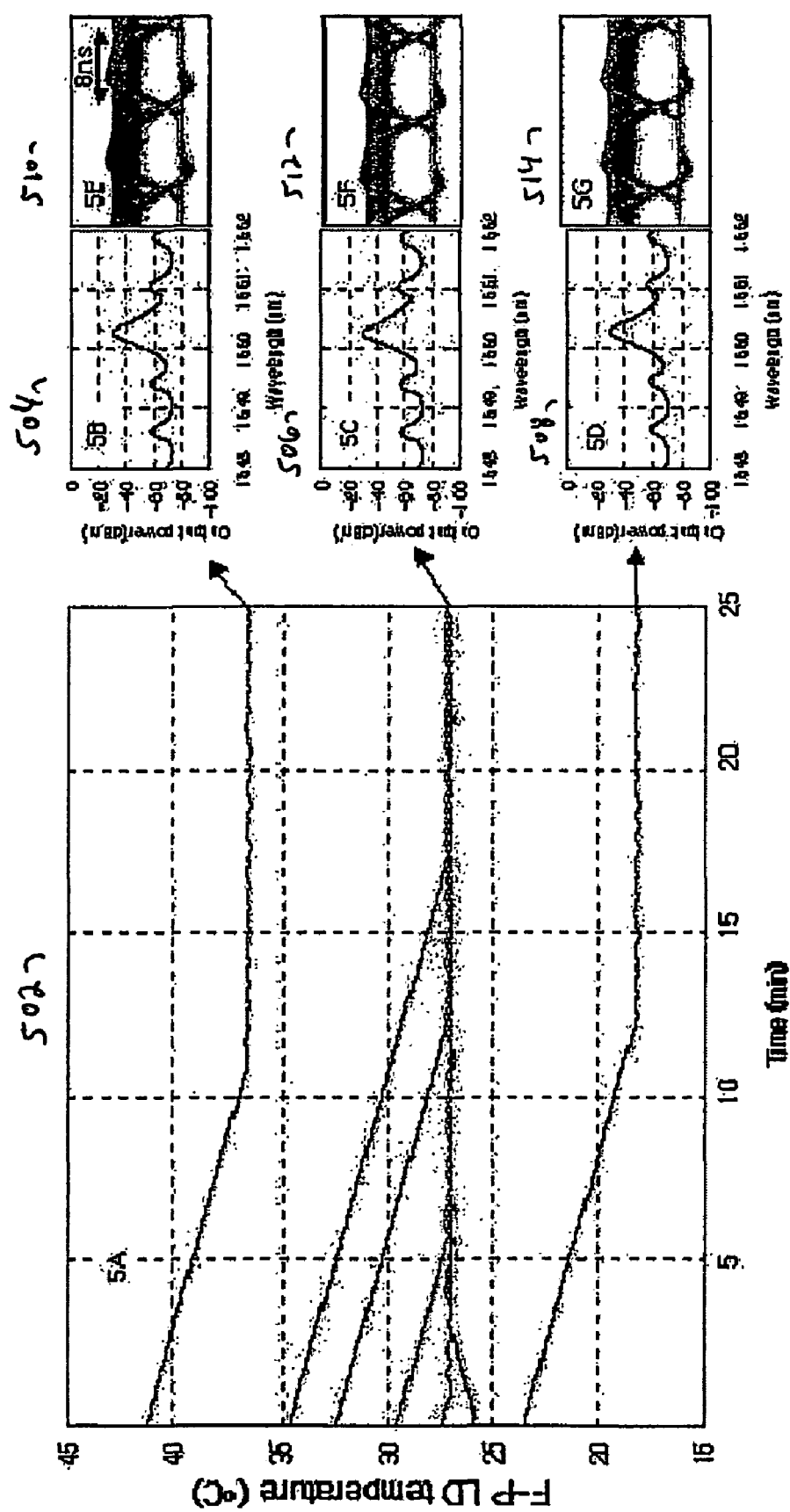
FIG. 5A illustrates a graph of temperatures of an embodiment of the optical transmitter based upon receiving a feedback signal over time when a narrow band signal with an arbitrary wavelength is injected into the optical transmitter and the corresponding output graphs and eye diagrams.

FIG. 5 illustrates a graph of example temperatures of an embodiment of the optical transmitter based upon receiving a feedback signal over time when a narrow band signal with an arbitrary wavelength is injected into the optical transmitter and the corresponding output graphs and eye diagrams. The first graph 502 illustrates seven different starting operating temperatures of the optical transmitter, temperatures 23.38, 25.9, 27.35, 29.55, 32.43, 34.62, 41.3 degrees Celsius, and three end temperatures, 17.91, 27.35, 36.08 degrees Celsius where the resonant wavelength of the optical transmitter and the wavelength of the injected wavelength signal are wavelength locked. The second through fourth graphs 504-508 illustrate the output spectrum of the optical transmitter measured after temperature is stabilized. The fifth graph 510 through the seventh graph 514 illustrate the eye diagrams after temperature is stabilized.

As shown in the first graph 502, the starting the temperature of the optical transmitter may start at 23.38 degree Celsius. The temperature controller may adjust the temperature of the optical transmitter to 17.91 degrees, based on the feedback signal from, for example, the current detector where the bias current has local decrease. When the starting temperature of the optical transmitter starts between 25.9 and 32.43 degrees Celsius, the temperature controller adjusts the temperature of the optical transmitter to 27.35 degrees Celsius based on the feedback signal from the current detector. Also, when the starting temperature of the optical transmitter starts at 41.3 degrees Celsius, the temperature controller adjusts the temperature of the optical transmitter to 36.08 degrees Celsius based on the feedback signal from, for example, the optical detector.

Note, the temperature controller could also adjust the temperature of the optical transmitter based on a combination of feedback signals from both the optical power detector and the current detector.

An automatic power controller may also be used to control the bias current supplied to the optical transmitter and receive feedback signal from the optical power meter. The automatic power controller controls the average bias current flowing into the optical transmitter so that an average optical power received at the optical power monitor is maintained at approximately a maximum level.

For an embodiment, the Fabry-Perot laser diode may have antireflective coating on one or more facets of the laser diode.

Figure 6A:
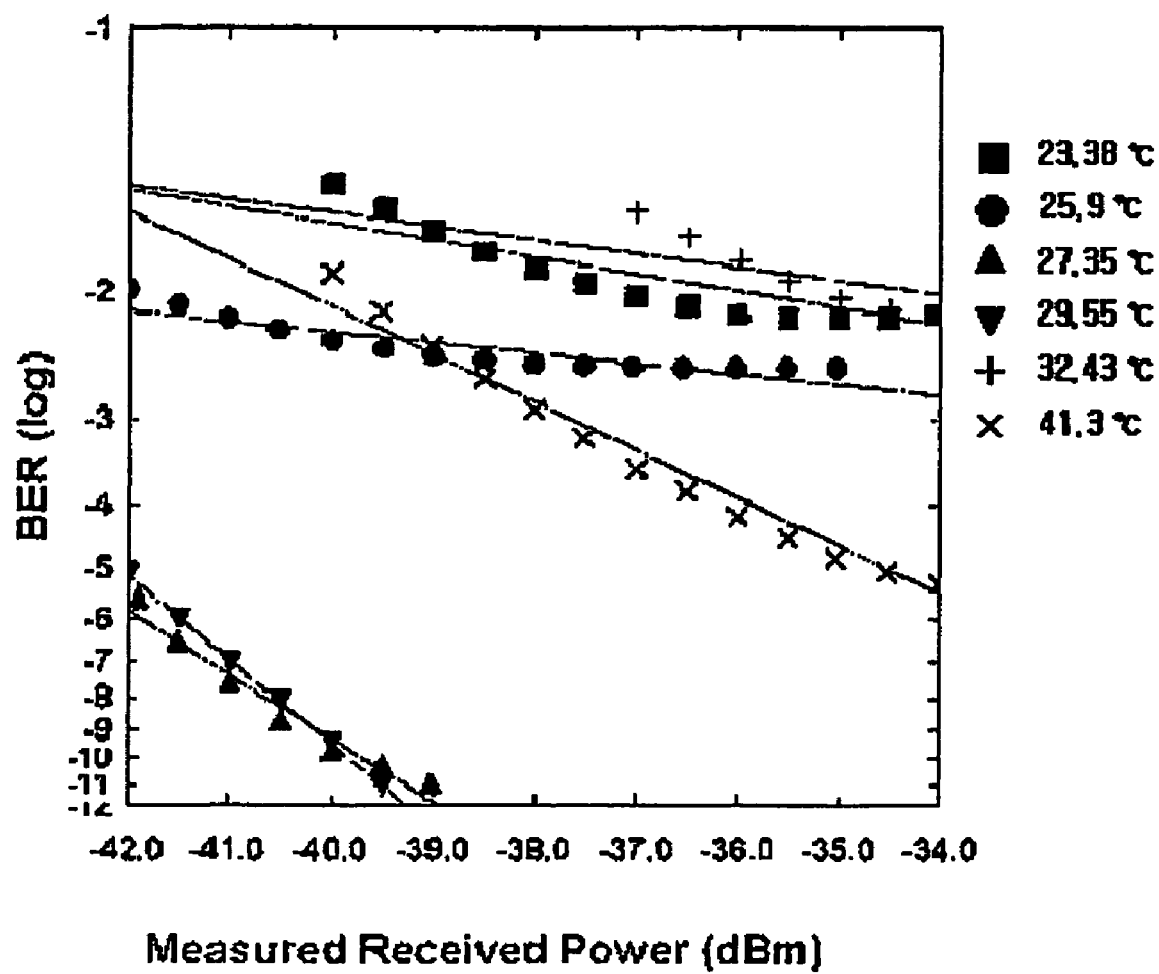
FIG. 6A and FIG. 6B illustrate graphs of the curve of bit error ratio measured before and after applying the wavelength matching method shown in FIGS. 5A-5G.
Figure 6B:
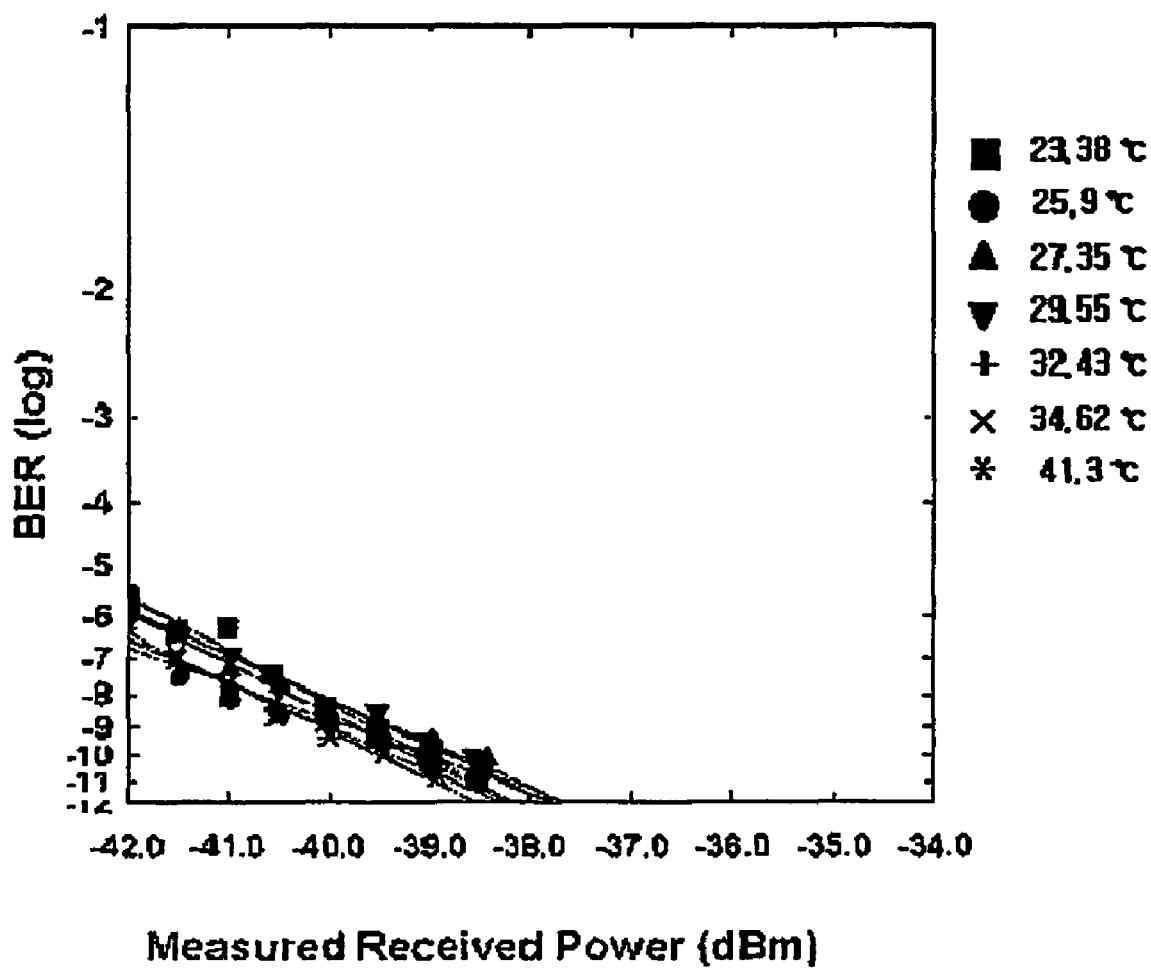

Referring to FIG. 1, expected results from an experimental setup would be as follows. Merely, the bias current was controlled to maintain the average received optical power of the monitor photo-diode 122 at approximately a maximum level. Modulation current was provided at 125 Mb/s 27-1 psuedo-random bit sequence digital signals generated from the pulse pattern generator 128. The central wavelength and threshold current of the Fabry-Perot laser diode 116 used for the experiment were 1550 nm and 8 mA respectively at 30 degrees, and both bias current and modulation current were 6 mA. Also, the space between the cavity modes/oscillation modes of the Fabry-Perot laser diode 116 was about 0.8 nm. The band pass filter 108 had a 3-dB pass bandwidth of 0.4 nm and a central wavelength of 1550.3 nm. The optical coupler 110 was a 2×2 optical coupler. Also, the optical spectrum analyzer 114 measured the spectrum of incoherent light injected through the optical switch and the output spectrum of the Fabry-Perot laser diode 116 through the 2×2 optical coupler 110. The optical power of received signals is controlled through a feedback loop that consists of optical power meter 122 and a computer 142. The Fabry-Perot laser diode 116 was directly modulated, however, the average current measurement value of the Fabry-Perot laser diode 116 could be determined with or without modulation. FIGS. 6A and 6B show experimental bit error curves based on the experimental setup.

FIG. 6A and FIG. 6B illustrate example graphs of the curve of bit error ratio measured before and after applying the wavelength matching method shown in FIGS. 5A-5G. As shown in FIG. 6a, the deviation of bit error ratio varied greatly according to temperature of the Fabry-Perot laser diode before application of the wavelength matching method. However, as shown in FIG. 6B, after application of the wavelength matching method, the bit error ratio at all temperatures of the Fabry-Perot laser diode became similar to the smallest bit error ratio before the application of the wavelength matching method.

Figure 7:
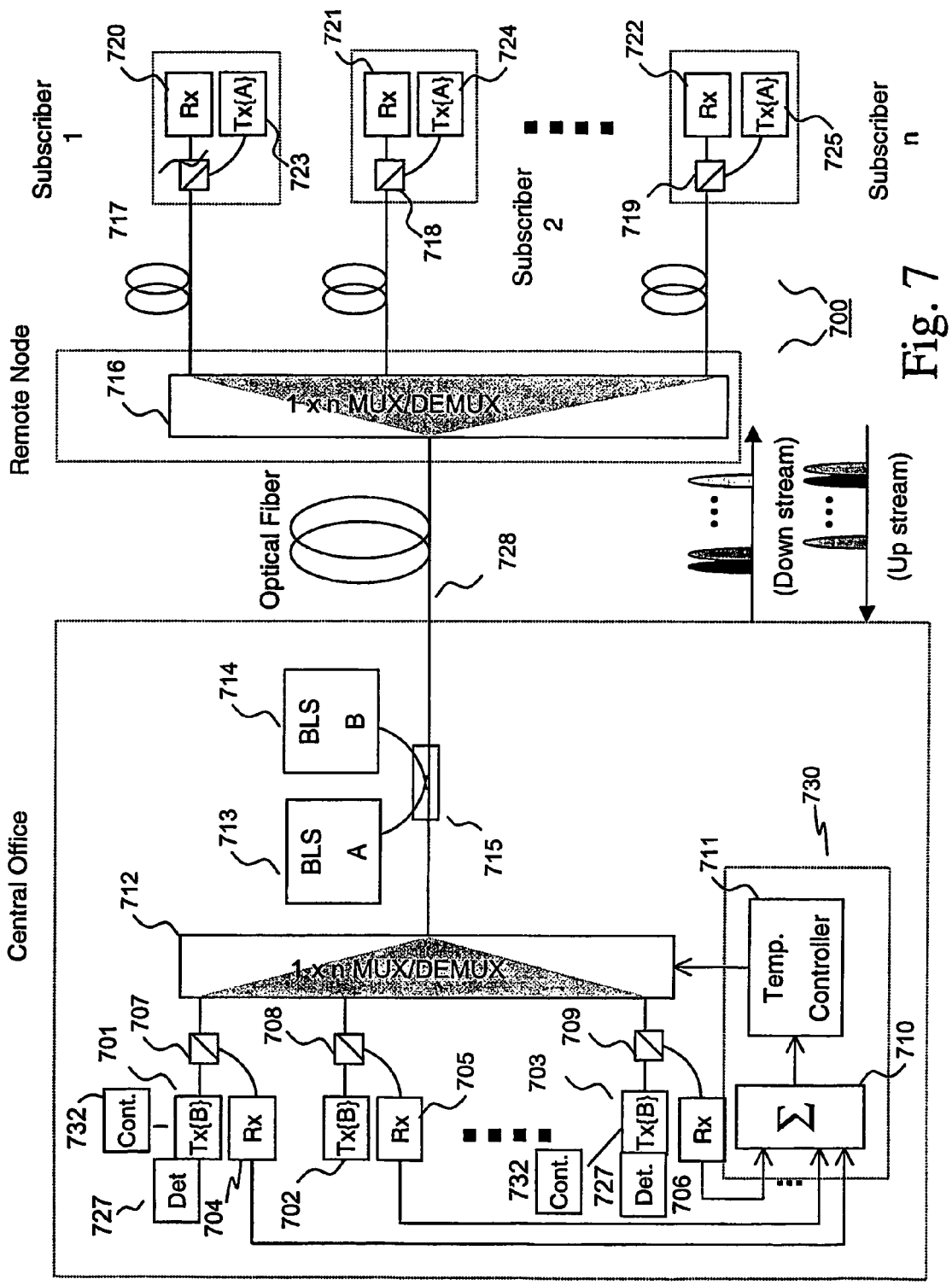
FIG. 7 illustrates a block diagram of an embodiment of a wavelength-division-multiplexing passive-optical network using an optical transmitter cooperating with a controller and a detector.

FIG. 7 illustrates a block diagram of an embodiment of a wavelength-division-multiplexing passive-optical network using an optical transmitter cooperating with a controller and a detector. The example central office contains a first group of optical transmitters 701-703 emitting optical signals in a first band of wavelengths, a first group of optical receivers 704-706 to accept an optical signal in a second band of wavelengths, a first group of band splitting filters 707-709, a wavelength-tracking component 730, a first 1×n bi-directional optical multiplexer/demultiplexer 712, a first optical coupler 715, a detector 727, a controller 732, a first broadband incoherent light source 714, and a second broadband incoherent light source 713.

The first optical multiplexer/demultiplexer 712 spectrally slices a first band of wavelengths received from the first broadband incoherent light source 714 and demultiplexes a second band of wavelengths received from the second optical multiplexer/demultiplexer 716. Each optical transmitter in the first group of optical transmitters 701-703 receives a discrete spectrally sliced signal in the first band, of wavelengths.

One or more of the optical transmitters 701-703 have a resonance wavelength characteristic that varies with the refractive index of the optical transmitter such as a Fabry-Perot laser diode. Each optical transmitter 701-703 receives the narrow band spectrally sliced signal from the incoherent light source 714.

The controller 732 substantially matches a resonant wavelength of the optical transmitter, for example the first optical transmitter 701, to the wavelength of the injected spectrally sliced signal by changing the refractive index of the optical transmitter. The controller 732 may change the refractive index of the optical transmitter by, for example, controlling the operating temperature of the optical transmitter or changing the bias current supplied to the optical transmitter. The detector 727 measures a parameter of the optical transmitter 701, such as the bias current through the optical transmitter 701 or the optical power from the optical transmitter 701, to provide a feedback signal to the controller 732 to determine when the resonant wavelength of the optical transmitter 701 and the wavelength of the injected wavelength signal are substantially matched.

Each optical receiver in the first group of optical receivers 704-706 receives a discrete demultiplexed signal in the second band of wavelengths. The first multiplexer/demultiplexer 712 couples to a first group of band splitting filters 707-709.

A band splitting filter, such as the first broadband splitting filter 707, splits the first band of wavelengths and the second band of wavelengths signals to different ports. Each band splitting filter 707-709 couples to a given optical transmitter in the first group of optical transmitters 701-703 and a given optical receiver in the first group of optical receivers 704-706. For example, the first band splitting filter 707 couples a spectrally sliced signal in the first band of wavelengths to the first optical transmitter 701. Thus, if the wavelength of an input optical signal is in first band of wavelengths, the output signal from the first band splitting filter 707 is passed to the port parallel to the input port. The first band splitting filter 707 couples a demultiplexed signal in the second band of wavelengths to the first optical receiver 704. Thus, in the case that the wavelength of input signal is in the second band of wavelengths, the output port is, for example, orthogonal to the input direction.

The wavelength tracking component 730 includes an electrical or optical power summing device 710 and a temperature controller 711. The power summing device 710 measures the strength of an output signal of one or more of the optical receivers 704-706 to determine the difference in the transmission band of wavelengths between the first multiplexer/demultiplexer 712 and the second multiplexer/demultiplexer 716. The temperature controller 711 controls the operating temperature of the first optical multiplexer/demultiplexer 712 to maximize the strength of the measured output signal from the optical receivers 704-706. When the transmission band of wavelengths of the first multiplexer/demultiplexer 712 and the second multiplexer/demultiplexer 716 are matched, then the strength of the measured output signal from the optical receivers 704-706 is at its maximum. The temperature controller 711 alters an operating parameter of the first multiplexer/demultiplexer, such as its temperature, based on the control signal to control the transmission band of wavelengths of the first multiplexer/demultiplexer.

Thus, the multiplexed/demultiplexed transmission wavelength of the optical multiplexer/demultiplexers 712, 716 located in the central office and the remote node can be locked to each other. The transmission band of wavelengths locking is accomplished by tracking the demultiplexed wavelength from the remote node and then altering the transmission wavelength of the optical multiplexer/demultiplexer located in the central office. The transmission band of wavelength is altered by, for example, moving the temperature of the optical multiplexer/demultiplexer in the direction of maximizing the strength of light measured at a specific port of the optical multiplexer/demultiplexer located at the central office.

The example remote node contains the second 1×n bi-directional optical multiplexer/demultiplexer 716. The second 1×n bi-directional optical multiplexer/demultiplexer 716 connects to the central office via a single optical fiber 728. The second 1×n optical multiplexer/demultiplexer 716 multiplexes and demultiplexes bi-directionally both the broadband optical signal containing the first band of wavelengths and the broadband optical signal containing the second band of wavelengths. The second 1×n optical multiplexer/demultiplexer 716 spectrally slices the second band of wavelengths from the second broadband light source 713.

Generally, multiplexing may be the combining of multiple channels of optical information into a single optical signal. Demultiplexing may be the disassembling of the single optical signal into multiple discrete signals containing a channel of optical information. Spectral slicing may be the dividing of a broad band of wavelengths into small periodic bands of wavelengths.

Each example subscriber location, for example, the first subscriber location, contains a band splitting filter 717, an optical transmitter 723 to emit optical signals in the second band of wavelengths, and an optical receiver 720 to receive optical signals in the first band of wavelengths. The second multiplexer/demultiplexer 716 to demultiplex the first band of wavelengths and spectrally slice the second band of wavelengths. The second multiplexer/demultiplexer sends these signals to each band splitting filter 717-719. The band splitting filters 717-719 function to split the input signal to an output port according to the input signal band. Each optical transmitter, such as the second optical transmitter 723, receives the spectrally sliced signal in the second band of wavelengths and aligns its operating wavelength for that optical transmitter to the wavelengths within the spectrally sliced signal. Components similar to controller 732 and detector 727 for transmitters 723-725 may be present to aid in matching the wavelength of the transmitters 723-725 to injected wavelength. Each subscriber communicates with central office with a different spectral slice within the second band of wavelengths.

The broadband light sources 713, 714 may be natural emission light sources that generate incoherent light. A 2×2 optical coupler 715 operating in both the first band of wavelengths and the second band of wavelengths couples the first broadband light source 714 and the second broadband light source 713 to the single fiber 728. The optical power directed into the first broadband light source 714 is terminated, while the other power propagates along the optical fiber cable so that each subscriber's optical transmitter 723-725 gets the broadband of light sliced by the 1×n optical multiplexer/demultiplexer 716 at the remote node.

The first broadband light source 714, such as an amplified-spontaneous-emission source, supplies the first band of wavelengths of light to a given optical transmitter in the first group of optical transmitters 701-703 in order to provide the narrow band spectral slice of incoherent light to that optical transmitter. Thus, the range of operating wavelengths for the group of transmitters 701-703 in the central office is matched to the operating wavelengths of the first multiplexer/demultiplexer 712 in the central office via the injection of these spectrally sliced signals into each of these transmitters in the first group of optical transmitters 701-703. The wavelength locking of the each optical transmitter to the particular spectral slice passed through the band splitting filter can solve the large power loss on up-stream signals in the 1×n optical multiplexer/demultiplexer 712 due to the wavelength detuning depending on the temperature variation in the device at the remote node. In this way, the large power loss due to the misalignment between the wavelength of the signal from an optical transmitter 701-703 and the transmission band of wavelengths of the multiplexer/demultiplexer 712 at the central office is minimized.

Similarly, the second broadband light source 713 supplies the second band of wavelengths of light to a given optical transmitter 723-725 to wavelength lock the transmission band of wavelengths of that optical transmitter in the second group. Thus, the operating wavelengths of the second group of transmitters 723-725 in the subscriber's local is matched to the range of operating wavelengths for the second multiplexer/demultiplexer 716 via the injection of these spectrally sliced signal into each of these transmitters in the second group of optical transmitters. The wavelength locking of the each optical transmitter to the particular spectral slice passed through the band splitting filter solves the large power loss on up-stream signals in the 1×n optical multiplexer/demultiplexer 716 due to the wavelength detuning depending on the temperature variation in the device at the remote node. In this way, the large power loss due to the misalignment between the wavelength of the signal from an optical transmitter 723-725 and the transmission band of wavelengths of the multiplexer/demultiplexer 716 at the remote node is minimized.

For an embodiment, the transmission wavelength controller to control the transmission wavelengths of the passband for each channel of the first multiplexer/demultiplexer 712 may be a strain controller, voltage controller, a temperature controller, or other similar device. The transmission wavelength controller alters an operating parameter of the first multiplexer/demultiplexer based on the control signal to control the transmission band of wavelengths of the first multiplexer/demultiplexer.

For an embodiment, an optical-passive-network consists of non-power supplied passive optical devices without any active devices between the central office and optical subscribers. The topology structure of the optical distribution network may be a star topology that has the remote node with an optical multiplexer/demultiplexer placed near the subscribers, and plays a role to relay communications with the central office through a single optical fiber and to distribute signals to and from each of the subscribers through their own optical fiber. The second multiplexer/demultiplexer may be in a remote location such that the ambient conditions differ enough from the environment of the first multiplexer/demultiplexer to substantially alter the transmission band of wavelengths of the second multiplexer/demultiplexer when matched to the transmission band of wavelengths of the first multiplexer/demultiplexer.

As discussed, the wavelength-division-multiplexing passive-optical network 700 may use different wavelength bands in downstream signals, such as the first band of wavelengths, and up-stream signals, such as the second band of wavelengths. The down-stream signals may represent the signals from optical transmitters 701-703 in the central office to the subscribers and the up-stream signals may represent the signals from optical transmitters 723-725 in the subscribers to the central office. The wavelengths of the down-stream signals may be, for example, $\lambda 1$, $\lambda 2$, ... $\lambda n$ and the upstream signals would be $\lambda 1^*$, $\lambda 2^*$, $\lambda n^*$ but carried in a different band of wavelengths, where $\lambda 1$ and $\lambda 1^*$ are separated by the free spectral range of the multiplexer/demultiplexer.

As discussed, the 1×n optical multiplexer/demultiplexer 716 has the function that an optical signal from a port in the left side is demultiplexed to the n number of ports in the right side. Further, the optical signals from the n-ports in the right side are multiplexed to a port in the left side simultaneously. The 1×n optical multiplexer/demultiplexer 716 spectrally splices the second band of wavelengths into narrow spectral widths of wavelengths. Because the optical multiplexer/demultiplexer can be operated on more than two bands of wavelengths, the bi-directionally propagated up-stream signals and down-stream signals in different bands can be multiplexed and demultiplexed at the same time. Each of the bands of wavelengths operated on by the optical multiplexer/demultiplexer may be offset by one or more intervals of the free spectral range of the optical multiplexer/demultiplexer.

Each optical transmitter may be directly modulated by, for example, electrical current modulation to embed information onto the specific wavelength transmitted by that optical transmitter. For an embodiment, one or more of the optical transmitters may be a Fabry-Perot semiconductor laser that is injected with the spectrum-sliced broadband incoherent light from an amplified-spontaneous-emission light source. For an embodiment, one or more of the optical transmitters may be a wavelength-seeded reflective semiconductor optical amplifier (SOA). One or more of the optical transmitters support high bit-rate modulation and long-distance transmission. A reflective SOA may also as act as the modulation device. The optical transmitters may be modulated, wavelength locked using wavelength seeding, provide signal gain for the wavelengths within the spectral slice and increase the extinction ratio between the injected wavelengths and wavelengths outside the spectral slice.

For an embodiment, a broadband light source may be a light source based on semiconductor optical amplifiers, a light source based on rare-earth ion-doped optical fiber amplifiers, a light emitting diode, or similar device.

For an embodiment, an optical multiplexer/demultiplexer can be achieved by an arrayed waveguide grating including an integrated waveguide grating, a device using thin-film filters, a diffraction grating, or similar device. The optical multiplexer/demultiplexer can also be a dielectric interference filter or similar device.

For an embodiment, the second band of wavelengths may be a band of wavelengths having a spectral separation of between 5-100 nanometers apart from a peak wavelength of the first band of wavelengths. The spectral separation between the first band of wavelengths and the second band of wavelengths should be great enough to prevent the occurrence of interference between the filtered spectrally sliced downstream signal to a subscriber and the filtered upstream signal from that subscriber.

Note, the specific numeric reference should not be interpreted as a literal sequential order but rather interpreted that the first band of wavelength is different than a second band of wavelengths. Thus, the specific details set forth are merely exemplary.

Some additional embodiments may include: a single device may provide the function of both the first broadband light source and the second broadband light source; the WDM PON may use more than two different bands of wavelengths; each multiplexer/demultiplexer may be an athermal arrayed waveguide grating; each multiplexer/demultiplexer may merely divide an input light signal rather than spectrally slice the input light signal; more than one remote node may exist; the controller may be a temperature controller, a power controller, or similar device; an optical transmitter may be operated continuous wave and modulated by an external modulator; etc.

In the forgoing specification, the invention has been described with reference to specific exemplary embodiments thereof. It will, however, be evident that various modifications and changes may be made thereto without departing from the broader spirit and scope of the invention as set fourth in the appended claims. The specification and drawings are, accordingly, to be regarded in an illustration rather then a restrictive sense.

We claim:

1. An apparatus, comprising:
   an optical transmitter having a resonance wavelength characteristic that varies with a refractive index of the optical transmitter, wherein the optical transmitter receives a narrow band injected wavelength signal from an incoherent light source;
   a controller that substantially matches a resonant wavelength of the optical transmitter to the wavelength of the injected wavelength signal by changing the refractive index of the optical transmitter; and
   a detector to measure a parameter of the optical transmitter to provide a feedback signal to the controller to control the refractive index of the optical transmitter, wherein the detector measures the parameter to detect a local dip in an increasing trend of the parameter indicating that the resonant wavelength of the optical transmitter and the wavelength of the injected wavelength signal are substantially matched.

2. The apparatus of claim 1, wherein the optical transmitter having a resonance wavelength characteristic that varies with the refractive index of the optical transmitter is a Fabry-Perot laser diode.

3. The apparatus of claim 2, wherein the controller is an automatic power controller and the detector is a monitor photo-diode, and the automatic power controller controls the average bias current flowing into the Fabry-Perot laser diode so that an average optical power received at the monitor photo-diode is maintained at approximately a maximum level.

4. The apparatus of claim 1, wherein the optical transmitter having a resonance wavelength characteristic that varies with the refractive index of the optical transmitter is a Fabry-Perot laser diode with antireflective coating on one or more facets of the laser diode.

5. The apparatus of claim 1, wherein the controller changes the operating temperature of the optical transmitter to change the refractive index of the optical transmitter.

6. The apparatus of claim 1, wherein the controller changes the bias current supplied to the optical transmitter to change the refractive index of the optical transmitter.

7. The apparatus of claim 1, wherein the detector is an optical power monitor and the controller is a temperature controller that controls the direction and strength of temperature emitted from a thermo-electric cooler so that an average optical power received at the optical power monitor is maintained at approximately a maximum level.

8. The apparatus of claim 7, further comprising: a power detector to measure bias current supplied to the optical transmitter; and an automatic power controller to control the average bias current flowing into the Fabry-Perot laser diode so that the average bias current supplied to the optical transmitter is at a decreasing dip from a linear slope of the bias current.

9. The apparatus of claim 1, further comprising: a wavelength division multiplexer to route the narrow band wavelength to the optical transmitter.

10. The apparatus of claim 9, further comprising: a broadband light source to supply a broadband wavelength signal to the wavelength division multiplexer and the wavelength division multiplexer spectrally slices the broadband wavelength signal.

11. The apparatus of claim 9, wherein the wavelength division multiplexer and the optical transmitter are included in a passive optical network.

12. A method, comprising:
injecting a narrow band wavelength signal from a broadband light source into an optical transmitter having a resonance wavelength characteristic that varies with the refractive index of the optical transmitter;
wavelength locking the resonant wavelength of the optical transmitter to the wavelength of the injected wavelength by shifting a refractive index of the optical transmitter; and
monitoring a parameter of the optical transmitter to detect a local dip in an increasing trend of the parameter that provides a feedback signal to control the refractive index of the optical transmitter, wherein the local dip in the increasing trend of the parameter indicates that the resonant wavelength of the optical transmitter and the wavelength of the injected wavelength signal are wavelength locked.

13. The method of claim 12, further comprising: changing the temperature of the optical transmitter to wavelength lock the resonant wavelength of the optical transmitter to the wavelength of the injected wavelength signal.

14. The method of claim 13, further comprising: controlling also the bias current supplied to the optical transmitter to wavelength lock the resonant wavelength of the optical transmitter to the wavelength of the injected wavelength signal.

15. The method of claim 12, further comprising: monitoring the optical power emitted from the optical transmitter to provide a feedback signal to determine when the resonant wavelength of the optical transmitter and the wavelength of the injected wavelength signal are wavelength locked.

16. The method of claim 12, further comprising: controlling the bias current supplied to the optical transmitter to wavelength lock the resonant wavelength of the optical transmitter to the wavelength of the injected wavelength signal.

17. The method of claim 12, further comprising: comparing a previous current that had flown into the optical transmitter with the present current flowing into the optical transmitter to provide the feedback signal to determine when the resonant wavelength of the optical transmitter and the wavelength of the injected wavelength signal are wavelength locked.

18. An apparatus, comprising:
means for injecting a narrow band wavelength signal from a broadband light source into an optical transmitter having a resonance wavelength characteristic that varies with the refractive index of the optical transmitter;
means for wavelength locking the resonant wavelength of the optical transmitter to the wavelength of the injected wavelength by shifting a refractive index of the optical transmitter; and
monitoring a parameter of the optical transmitter to detect a local dip in an increasing trend of the parameter that provides a feedback signal to control the refractive index of the optical transmitter, wherein the local dip in the increasing trend of the parameter indicates that the resonant wavelength of the optical transmitter and the wavelength of the injected wavelength signal are wavelength locked.

19. The apparatus of claim 18, further comprising: means for changing the temperature of the optical transmitter to wavelength lock the resonant wavelength of the optical transmitter to the wavelength of the injected wavelength signal.

20. The apparatus of claim 18, further comprising: means for monitoring the optical power emitted from the optical transmitter to the provide feedback signal to determine when the resonant wavelength of the optical transmitter and the wavelength of the injected wavelength signal are wavelength locked.

21. The apparatus of claim 18, further comprising: means for controlling the bias current supplied to the optical transmitter to wavelength lock the resonant wavelength of the optical transmitter to the wavelength of the injected wavelength signal.

* * * * *

UNITED STATES PATENT AND TRADEMARK OFFICE
CERTIFICATE OF CORRECTION

PATENT NO. : 7,593,647 B2  Page 1 of 1
APPLICATION NO. : 10/528445
DATED : September 22, 2009
INVENTOR(S) : Lee et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 501 days.

Signed and Sealed this

Twenty-first Day of September, 2010

David J. Kappos
*Director of the United States Patent and Trademark Office*